M. Wilcox,
Pump.

No. 106,904. Patented Aug. 30, 1870.

Witnesses.
Albert Gallatin
W. R. S. Foye

Inventor.
Martin Wilcox

United States Patent Office.

MARTIN WILCOX, OF SACRAMENTO, CALIFORNIA.

Letters Patent No. 106,904, dated August 30, 1870.

---

IMPROVEMENT IN PUMPS.

---

The Schedule referred to in these Letters Patent and making part of the same.

---

I, MARTIN WILCOX, of the city and county of Sacramento, and State of California, have made certain Improvements in Pumps, of which the following is a specification.

The design of this invention is to secure the working parts of a pump against injury from sand or other substances contained in the water or other liquid to be pumped.

It is especially designed for mining work, in which sandy or muddy water causes general and rapid destruction of working-parts of pumps.

To secure the desired advantage, I arrange to introduce a small but constant supply of clear water or oil to fill the open space below the piston-head or plunger, between it and the water which is worked through the lower part of the pump into the discharge.

As a means of procuring clear water for that purpose, I take water from the discharge-pipe and pass it through a filter. For the introduction of this water, I make a suitable ingress-passage, with valve, to lead water into the cylinder or working-barrel below the space traversed by the piston.

For additional security, I make the cylinder quite long, and attach to and below the piston a loosely-fitting cylinder, which, with clear water or oil surrounding it, forms an effective partition between the piston and the muddy water below.

I also make a valved ingress-passage through the piston-head or plunger, by which water may pass from above it into the space below it.

Figure 1:
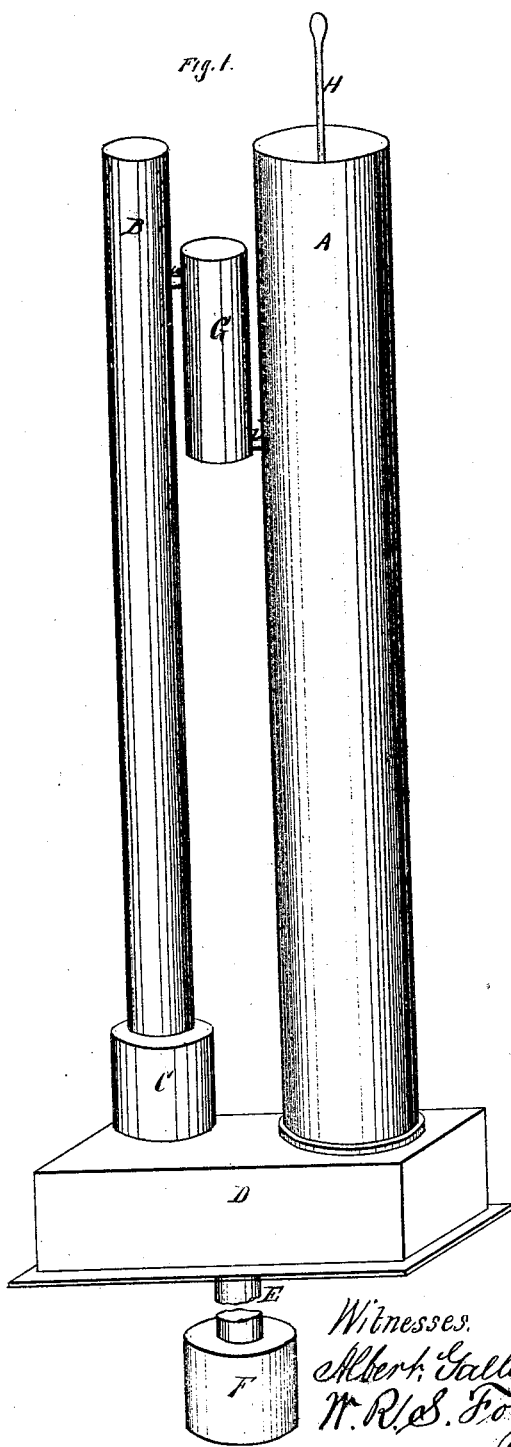
Figure 1 is a side view.
Figure 2:
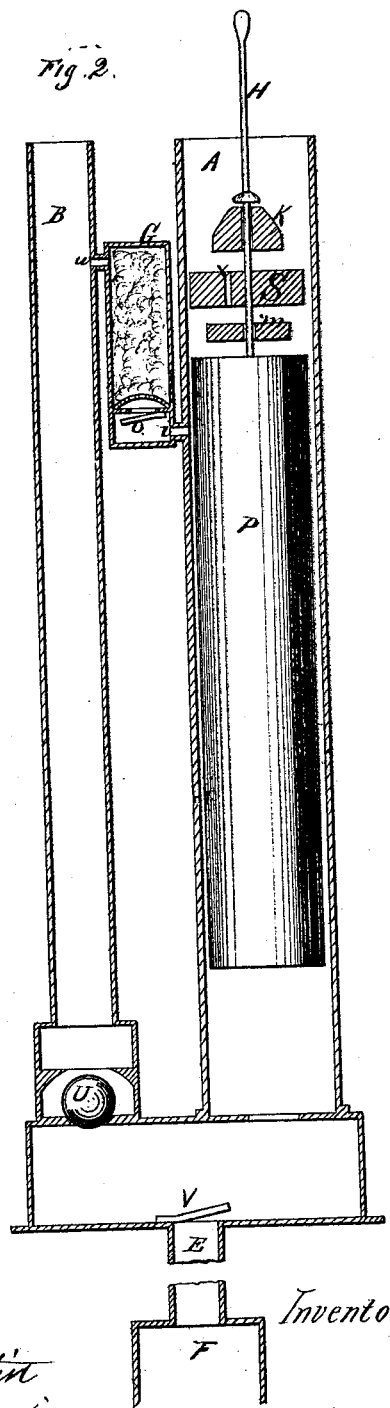
Figure 2 is a vertical section.
A is the cylinder or working barrel.
B, the discharge-pipe.
C, a valve-chamber.
D, a valve-chamber, and communicates with A, B, and E.
E is the supply-pipe.
F, a chamber on lower end of E.
G, a filter, receiving water from E.
H, the piston-rod.
S, the piston-head.
$x$, a small ingress-passage for water or oil.
K, a floating valve, covering $x$ above.
$m$, another valve, closing $x$ below.
P, a loosely-fitting cylinder attached to H or S.
V, U, and O are valves.
W and $i$ are water-passages, letting water into G and A.

The action of the pump is as follows:
Suppose the pump full of water, and the piston raised. Pushing the piston down closes V, $m$, and O, opens U, and discharges through B. Raising the piston closes K and U, and draws a small quantity of water into A through $i$, and a larger quantity through V.

If water is poured into the mouth or top of A, it will float the valve K until the water is drawn down through $x$, and K then settles on and closes $x$.

If water or oil is, by pressure of work, forced past the piston upward, it will be drawn back below through $x$ when the piston rises, as above explained.

It will now be seen that muddy water may be drawn from B, and, passing through filter G, become clear, and pass into A, and this supply, finding no outlet but downward, keeps the upper space of the cylinder filled with clear water, to the exclusion of the muddy water that would otherwise fill it from below.

If it is desirable, the filter, instead of discharging through $i$ into A at the side, as shown, may be raised and discharge into the top or mouth of A, and the water will be worked down through $x$ by the action of the valves K and $m$, as before explained. Or, instead of a continuous flow of water for that purpose, a sufficient quantity of oil may be introduced into the space below S, and it will remain there while the pump continues to work. Being lighter than water, it will not pass down into the discharge, and cannot escape above, for reasons given heretofore.

The piston does not rise to the top of G, nor pass below the opening $i$.

A very small supply of clear water will suffice to prevent rising of muddy water into the working space where the piston moves.

The chamber F is placed on the lower end of E to diminish the velocity of the rising water when drawn from near a sandy or muddy bottom, where a rapid draught would take up sand.

Claims.

I claim—

1. The arrangement of the passage $x$, with valves K and $m$, in combination with the piston S, the cylinder P, tube A, and valves V and U, operating as and for purposes substantially as set forth.

2. The cylinder P, in combination with piston S, passage $x$, valves K and $m$, V and U, tube A, and filter G, arranged and operating substantially as described.

3. The filter G, in combination with the tube A, cylinder P, pipe B, piston S, and valves V and U, arranged and operating substantially as represented.

MARTIN WILCOX.

Witnesses:
THOS. O'NEIL,
J. T. GREY.